United States Patent
Wu

(10) Patent No.: US 8,594,013 B2
(45) Date of Patent: Nov. 26, 2013

(54) SYSTEM, METHOD AND APPARATUS FOR IMPLEMENTING MULTIMEDIA CALL CONTINUITY

(75) Inventor: Dongjun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1223 days.

(21) Appl. No.: 12/470,769

(22) Filed: May 22, 2009

(65) Prior Publication Data

US 2009/0245180 A1 Oct. 1, 2009

Related U.S. Application Data

(63) Continuation of application No. PCT/CN2007/003258, filed on Nov. 19, 2007.

(30) Foreign Application Priority Data

Nov. 23, 2006 (CN) .......................... 2006 1 0162604

(51) Int. Cl.
*H04W 80/04* (2009.01)
*H04W 84/12* (2009.01)
*H04L 12/64* (2006.01)
*H04L 12/66* (2006.01)

(52) U.S. Cl.
USPC ............ 370/328; 370/338; 370/352; 370/401

(58) Field of Classification Search
USPC ........................................ 370/328
See application file for complete search history.

(56) References Cited

U.S. PATENT DOCUMENTS

| 7,424,025 B2 * | 9/2008 | Qian et al. ..................... 370/409 |
| 7,480,283 B1 * | 1/2009 | Sylvain .......................... 370/352 |

(Continued)

FOREIGN PATENT DOCUMENTS

| CN | 1741485 A | 3/2006 |
| CN | 1783822 A | 6/2006 |

(Continued)

OTHER PUBLICATIONS

European Patent Office, Extended European Search Report in European Application No. 07816863.0 (Jun. 7, 2010).

(Continued)

*Primary Examiner* — Ian N Moore
*Assistant Examiner* — Jenee Alexander
(74) *Attorney, Agent, or Firm* — Leydig, Voit & Mayer, Ltd.

(57) ABSTRACT

A system, method, and apparatus for implementing multimedia call continuity solve the problem that when a domain transfer happens, part of a media flow in a multimedia session cannot be transfer between bearers of different access modes. Besides a remote UE, the system further includes a multimode terminal MTF UE that supports media flow transfer between multiple modes and carries media flow transfer context information in an initiated media stream transfer request, and a media transfer function (MTF) that acts as an agent to initiate and perform a media renegotiation with the remote UE, according to the media flow transfer context information carried in the request. After the media renegotiation, the MTF UE or the MTF is adapted to release the media flow that needs to be transferred before the media renegotiation. Therefore, when a domain transfer happens, the media stream can be transferred between the bearers of different access modes that the MTF UE supports.

17 Claims, 15 Drawing Sheets

(56) References Cited

U.S. PATENT DOCUMENTS

| | | | |
|---|---|---|---|
| 7,533,174 B1* | 5/2009 | Lynch et al. | 709/227 |
| 7,729,346 B2* | 6/2010 | Lee et al. | 370/389 |
| 7,843,902 B2* | 11/2010 | Imbimbo et al. | 370/352 |
| 7,944,817 B1* | 5/2011 | Sylvain | 370/228 |
| 2002/0024943 A1* | 2/2002 | Karaul et al. | 370/338 |
| 2003/0009337 A1* | 1/2003 | Rupsis | 704/260 |
| 2004/0196867 A1* | 10/2004 | Ejzak et al. | 370/468 |
| 2006/0023675 A1 | 2/2006 | Karaoguz et al. | |
| 2006/0025111 A1 | 2/2006 | Karaoguz et al. | |
| 2006/0025135 A1 | 2/2006 | Karaoguz et al. | |
| 2006/0025148 A1 | 2/2006 | Karaoguz et al. | |
| 2006/0025149 A1 | 2/2006 | Karaoguz et al. | |
| 2006/0025151 A1 | 2/2006 | Karaoguz et al. | |
| 2006/0034335 A1 | 2/2006 | Karaoguz et al. | |
| 2006/0098619 A1* | 5/2006 | Nix et al. | 370/352 |
| 2006/0098627 A1 | 5/2006 | Karaoguz et al. | |
| 2006/0291450 A1* | 12/2006 | Ramachandran et al. | 370/352 |
| 2007/0058789 A1* | 3/2007 | Lim et al. | 379/88.17 |
| 2007/0091907 A1* | 4/2007 | Seshadri et al. | 370/401 |
| 2007/0223450 A1* | 9/2007 | Holmstrom et al. | 370/352 |
| 2008/0080480 A1* | 4/2008 | Buckley et al. | 370/352 |

FOREIGN PATENT DOCUMENTS

| | | | |
|---|---|---|---|
| CN | 1801998 A | 7/2006 | |
| CN | 1856166 A | 11/2006 | |
| EP | 1480408 A1 | 11/2004 | |
| WO | WO 2006/048697 A1 | 5/2006 | |
| WO | WO 2006/063536 A1 | 6/2006 | |

OTHER PUBLICATIONS

1st Office Action in corresponding Australian Application No. 2007324233 (Jul. 28, 2010).

1st Office Action in corresponding Chinese Application No. 200610162604.1 (Nov. 20, 2009).

1st Office Action in corresponding Russian Application No. 2009123827 (Oct. 1, 2010).

Written Opinion of the International Searching Authority in corresponding PCT Application No. PCT/CN2007/003258 (Mar. 6, 2008).

"3GPP TS 23.206—3rd Generation Partnership Project; Technical Specification Group Services and System Aspects; Voice Call Continuity (VCC) between Circuit Switched (CS) and IP Multimedia Subsystem (IMS); Stage 2 (Release 7)," Dec. 2007, Version 7.5.0, $3^{rd}$ Generation Partnership Project, Valbonne, France.

"3GPP TS 23.237—3rd Generation Partnership Project; Technical Specification Group Services and Architecture; IP Multimedia Subsystem (IMS) Service Continuity; Stage 2 (Release 8)," Sep. 2008, Version 8.1.0, $3^{rd}$ Generation Partnership Project, Valbonne, France.

"3GPP TS 23.279—3rd Generation Partnership Project; Technical Specification Group Services and System Aspects; Combining Circuit Switched (CS) and IP Multimedia Subsystem (IMS) services; Stage 2 (Release 8)," Sep. 2007, Version 8.1.0, $3^{rd}$ Generation Partnership Project, Valbonne, France.

"3GPP TS 24.229—3rd Generation Partnership Project; Technical Specification Group Core Network and Terminals; IP multimedia call control protocol based on Session Initiation Protocol (SIP) and Session Description Protocol (SDP); Stage 3 (Release 8)," Mar. 2011, Version 8.15.0, $3^{rd}$ Generation Partnership Project, Valbonne, France.

"3GPP TS 24.237—3rd Generation Partnership Project; Technical Specification Group Core Network and Terminals; IP Multimedia (IM) Core Network (CN) subsystem IP Multimedia Subsystem (IMS) Service Continuity; Stage 3 (Release 8)," Oct. 2008, Version 1.1.1, $3^{rd}$ Generation Partnership Project, Valbonne, France.

International Search Report in corresponding PCT Application No. PCT/CN2007/003258 (Mar. 6, 2008).

Rejection Decision in corresponding Japanese Application No. 2009-537470 (Sep. 27, 2011).

* cited by examiner

SYSTEM, METHOD AND APPARATUS FOR IMPLEMENTING MULTIMEDIA CALL CONTINUITY

CROSS-REFERENCE TO RELATED APPLICATIONS

This application is a continuation of International Patent Application No. PCT/CN2007/003258, filed Nov. 19, 2007, which claims priority to Chinese Patent Application No. 200610162604.1, filed Nov. 23, 2006, both of which are hereby incorporated by reference in their entirety.

FIELD OF THE TECHNOLOGY

The present invention relates to the field of communications, and more particularly, to a system, method, and apparatus for implementing multimedia call continuity.

BACKGROUND

In the past, mobile communication operators of one country or region only deploy access networks of one standard. Under this network condition, a user obtains services through a single-mode terminal. Taking a worldwide view, networks of different standards coexist.

With the selections of the operators in deploying networks as well as the mergers and obtainings between the operators, one operator may operate networks of multiple standards at the same time. Moreover, the growing demand of the user for mobile applications greatly promotes the rapid development of access technologies, so that many new access technologies, for example, Wireless Fidelity (WiFi), Worldwide Interoperability for Microwave Access (WiMAX), etc., come forth continuously. Therefore, providing the users with a seamless service transfer to ensure service continuity under heterogeneous access technologies has become an urgent requirement for the operators to satisfy the users' requirements and enhance their own competitiveness. Currently, a same set of core networks to support different access technologies and meanwhile support a terminal of different access modes (i.e. a multi-mode terminal, and a CSI terminal and a VCC terminal are both applications of the multi-mode terminal) is put forward to satisfy this requirement.

The combination of circuit-switched (CS) and Internet protocol (IP) multimedia system (IMS) services (CSI, combining CS bearers with IMS) is proposed by the 3rd Generation Project Partnership (3GPP), for combining advantages of a CS domain and an IMS domain by enhancing terminal capabilities and providing the users with multimedia service experience in conjunction with a network entity (CSI-AS) in the circumstance that an access network side supporting packet-switched (PS) domain can not bear real-time media.

In the above CSI solution, in terms of access network capabilities, a global system for mobile communications (GSM) network is required to support the dual transfer mode (DTM) technology, or a wide-band code division multiple access (WCDMA) network is required to support multi radio access bearer (multi RAB) technology so as to provide the CSI. A non-supporting access network can only use bearers of one type at the same time.

In the above CSI solution, in terms of terminal capabilities, the terminal is required to have the capability of providing a session association on networks of different access types to the user, and meanwhile the associated sessions may contain different media components. For example, a session association between an IMS voice call on a wireless local area network (WLAN) bearer and an IMS text of a PS bearer is provided to the user.

In the above CSI, the CSI-application server (CSI-AS) has the following functions.

1. Selection of whether to combine sessions established on different access networks initiated by the CSI terminal (caller) according to network policies.
2. Splitting of an IMS session to different access networks registered by the CSI terminal (as a callee) for connection after receiving the multimedia IMS session.
3. Generating of charging information related to the CSI.
4. Supplementary service processing related to the CSI.

Taking the splitting of the multimedia IMS session by the CSI-AS as an example, referring to FIG. 1, after receiving the multimedia IMS session, the CSI-AS splits the IMS session into a CS call and an IMS call, i.e. bears a real-time media component, for example, audio, video, etc., on a CS network, and bears a non-real-time media component, for example, text, etc. on a packet-based network, and may also bear the video in the PS domain if it is bearable for the user. Meanwhile, in order to ensure the service experience, the CSI requires that the real-time and non-real-time media components must be terminated to the same terminal of an opposition end user.

The voice call continuity (VCC) is an application provided in a home IMS network of the user, which enables a bi-directional transfer of a voice call of the user between the CS domain and the IMS network. The integrated IMS architecture makes it possible to provide a popular GSM voice call under the WLAN coverage. If the seamless voice call service is implemented between the CS domain and an IP connectivity access network (IP-CAN), not only the load of GSM/universal mobile telecommunications system (UMTS) is reduced, but also the gain of the operator is increased. In addition, the wired operator providing the Voice over IP (VoIP) service may also benefit from the integrated services provided by the 3GPP IMS architecture.

FIG. 2 shows an implementation architecture of 3GPP VCC. A set of functional entities is newly added in the IMS domain and the CS domain. Those functional entities are a route redirection entity, a CS domain adaptation entity, a domain selection control entity, and a domain transfer control entity.

1. The route redirection entity (the customized applications for mobile network enhanced logic (CAMEL) app in FIG. 2) is responsible for redirecting a CS domain call to the IMS domain to perform a call anchoring control. In general circumstances, the route redirection entity is co-located with the gsm service control function (SCF) in FIG. 2 and embodied as a service control point (SCP) in the CS domain.

2. The CS domain adaptation entity (the CS adaptation function (CSAF) in FIG. 2) is responsible for receiving the CS domain call redirected to the IMS domain and converting the call into an IMS domain call according to stored information (possibly information obtaining trough interacting with the CAMEL App).

3. The domain selection control entity (the domain selection function (DSF) in FIG. 2) is responsible for making a decision according to various policies such as a registration status and a call status of the user in the IMS domain, and controlling the call to be routed to a selected connection domain.

4. The domain transfer control entity (the domain transfer function (DTF) in FIG. 2) is responsible for anchoring the call in the IMS domain and controlling a transfer when transfer happens.

The above four functional entities are collectively referred to as a VCC service control entity.

Based on the above VCC service control entity, when the VCC terminal is conducting a voice session of an activity, a domain transfer may be initiated. In order to perform the domain transfer, a call initiated or accepted by the VCC terminal must be anchored to a DTF in a home IMS network of the VCC terminal. The DTF is an AS within a 3rd party call control (3PCC) function. In the VCC solution, a session control leg between the DTF and the VCC terminal is called an access leg, and the session control leg between the DTF and a remote user is called a remote leg. The transfer is replacing an old access leg by a new access leg. In general circumstances, the VCC terminal is able to sense the strength of radio signals of access networks more accurately than a core network, and thus domain transfer processes with high requirements for a delay are initiated from the terminal towards the network. When the VCC terminal of the user detects radio signals and other factors and determines that it needs to transfer from a source network to a destination network, the VCC terminal calls a special number in the destination network. A call request for the special number may be triggered to the DTF. As the original call has already been anchored at the DTF, the DTF associates the old and new calls according to a user ID. A media is renegotiated with the remote user terminal of the original call according to the media in the newly established call, and a media flow corresponding to the transferred call is redirected from a port of a multi-mode terminal in the transferred-out access network to a corresponding port in the transferred-in access network at the same time during the media renegotiation process. As the media negotiation is completed, the new call is established successfully. Then the call in the transferred-in access network is released by the DTF or the VCC user equipment (UE). Thus the voice call of the user is transferred to the destination network. During the transfer, the voice call of the user remains uninterrupted, thereby improving the user's service experience.

FIG. 3 is a flow chart of transferring a call from a CS domain to an IMS domain in the VCC.

0-1. A VCC UE determines that the call needs to be transferred to the IMS domain according to the wireless environment and calls a special number i.e. VCC domain transfer URI (VDI) in the IMS domain to initiate a domain transfer. The call request is forwarded from a proxy call session control function (P-CSCF) to a serving call session control function (S-CSCF) in the home IMS network of the VCC user for processing.

2. The S-CSCF triggers the call to the DTF for processing according to initial Filter Criteria (iFC) of the caller.

3. The DTF determines that the call is a domain transfer request according to the VDI in an INVITE, and finds the anchored session according to caller information.

4-8. The DTF acts as an agent of the user to renegotiate a session description protocol (SDP) by using media information in the transfer request with the remote user.

9. After the session of the destination network is established, the DTF releases call resources in the access part of the CS domain of the VCC user.

Based on the above contents related to the VCC, the following scenarios are considered.

In a first scenario, the multi-mode terminal supports UMTS terrestrial radio access network (UTRAN) CS access, UTRAN PS access and WLAN access, and can register with the IMS network through the PS and the WLAN. The user has the VCC service function. The user is registered in the CS domain and processes a call, and not registered in other domains. When the user moves to the cross-coverage covered by the UTRAN and WLAN (the CS session can be reserved due to the cross-coverage), the user initiates an IMS registration on a WLAN bearer and receives a non-real-time media session sent from the called side. If the user continues moving to a region only covered by the WLAN, a real-time media component borne on the CS network needs to be transferred to the WLAN bearer. Further, as only one session exists on the remote leg, the real-time media component should be transferred to a session where the non-real-time media component resides. A similar situation exists for the non-real-time media component.

In the above first scenario, if the user moves out of the WLAN coverage area after receiving the non-real-time media session sent from the called side, the multi-mode terminal activates the access of the PS domain under the UTRAN and registers with the IMS through the PS. Then, a transfer is initiated to transfer the non-real-time media session of the WLAN bearer to the PS bearer. A similar scenario exists for the real-time media session.

In a second scenario, when the multi-mode terminal only registers with the IMS accessed by the WLAN, a multimedia session is performed with the opposition end user. Then, the user moves to an edge region covered by the WLAN, and the registration in the CS domain is activated as the multi-mode terminal detects that the signal in the CS domain is better. A transfer of the real-time media in the multimedia call to the CS domain bearer is initiated.

The following media flow transfer modes that possibly occur may be derived from the above scenarios.

1. The real-time or non-real-time media component in the multimedia session is transferred to other bearers.

2. The real-time or non-real-time media session constituting associated sessions is transferred to other bearers.

3. The real-time or non-real-time media session constituting associated sessions is transferred to an existing session on other IP-CANs.

In the process of the invention, the inventor finds that the existing VCC technology only solves the problem of transfer of the voice session between bearers of different access modes, and thus can only implement the voice session continuity, but does not support the aforementioned media flow transfer modes that may possibly occur. That is, the existing VCC technology cannot solve the problem of transferring part of the media flow in the multimedia session on the multi-mode terminal between bearers of different access modes.

SUMMARY

Accordingly, various embodiments of the present invention provide a system, method, and apparatus for implementing multimedia call continuity, so as to transfer part of a media flow in a multimedia session between bearers of different access modes when a domain transfer happens.

A system is provided in an embodiment of the present invention. The system includes media transfer function (MTF) UE and further includes a MTF, adapted to perform a media renegotiation with the remote UE according to the media flow transfer context information carried in the request. After the media renegotiation is completed, the MTF UE or the MTF is adapted to release the media flow to be transferred before the media renegotiation.

A MTF UE is provided in an embodiment of the present invention. The MTF UE includes: a transfer unit, adapted to support the transfer of media flows between multiple access network; an initiating unit, adapted to initiate a media flow transfer request to a network side according to an indication of the transfer unit; and an information adding unit, adapted to add media flow transfer context information in the media flow transfer request initiated by the initiating unit. The MTF UE optionally includes a release unit, adapted to release the media flow to be transferred before a media renegotiation after knowing that the network side completes the media renegotiation, according to the media flow transfer context information added by the information adding unit.

A MTF is provided in an embodiment of the present invention. The MTF includes: an obtaining unit, adapted to obtain media flow transfer context information from a media flow transfer request initiated by a MTF UE; an agent unit, adapted to perform a media renegotiation with a remote UE, according to the media flow transfer context information obtained by the obtaining unit. The MTF optionally includes a release unit, adapted to release a media flow to be transferred before the media renegotiation after the agent unit completes the media renegotiation.

A method is provided in an embodiment of the present invention. The method includes the following steps: receiving, by a MTF, a media flow transfer request; and performing, by the MTF, a media renegotiation with a remote UE, according to media flow transfer context information carried in the media flow transfer request sent by a MTF UE. The method further includes releasing a media flow to be transferred before the media renegotiation after completing the media renegotiation.

In the embodiments of the present invention, a system, method, and apparatus for implementing multimedia call continuity are provided. The multi-mode terminal MTF UE supports media flow transfer between multiple modes and carries media flow transfer context information in an initiated media flow transfer request. The MTF acts as an agent to initiate and perform a media renegotiation with a remote UE with the context information. After the media renegotiation succeeds, the media flow to be transferred is released, thereby implementing the media flow transfer between bearers of different access modes.

In the embodiments of the present invention, the issue of the media flow transfer between bearers of different access modes of the multi-mode terminal is addressed by adding the MTF without influencing the existing flow of the VCC, the mobile experience of the user is improved, and the competitiveness of the operator in network mobility services is also enhanced.

DETAILED DESCRIPTION

With the movement of a multi-mode terminal, when a domain transfer happens, part of a media flow component in a multimedia session on the multi-mode terminal is transferred in different access networks supported by the multi-mode terminal, so as to maintain the continuity of the multimedia session.

Figure 1:
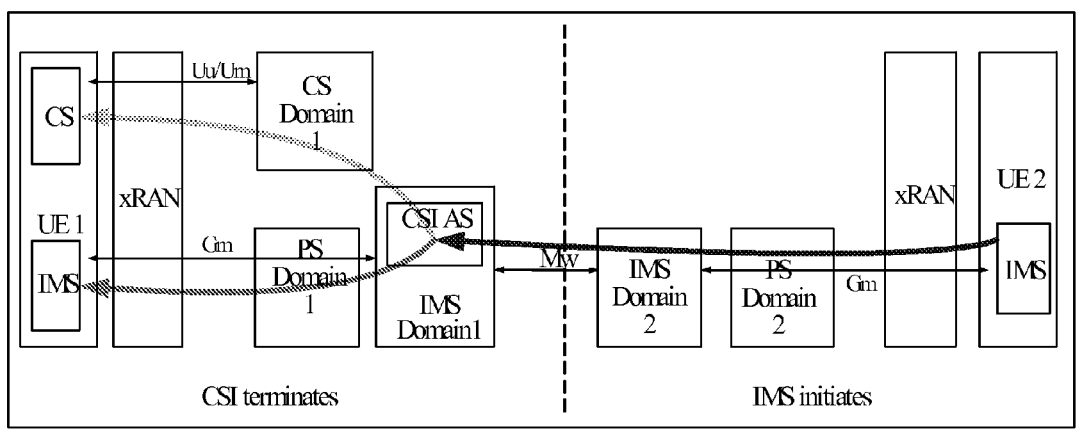
FIG. 1 is a schematic view of a splitting of a multimedia IMS session by a CSI-AS in the conventional art.
Figure 2:
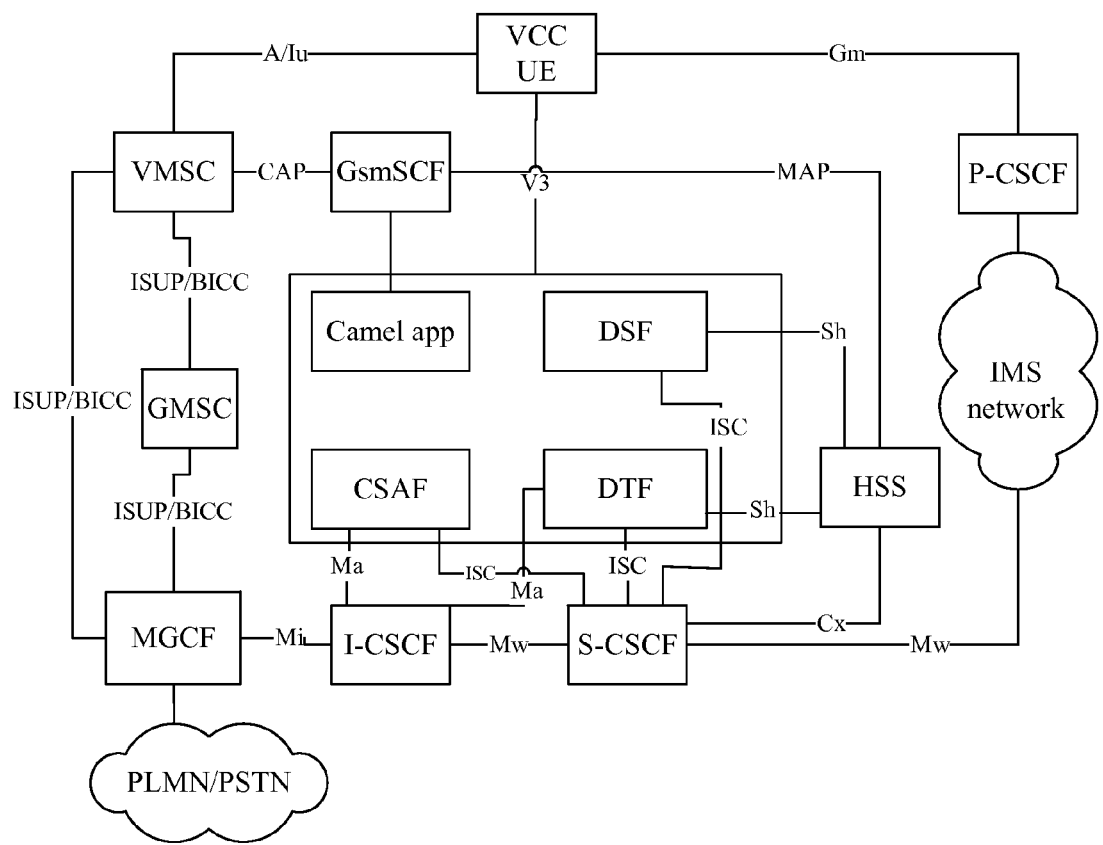
FIG. 2 is a schematic view of an implementation architecture of an existing 3GPP VCC.
Figure 3:
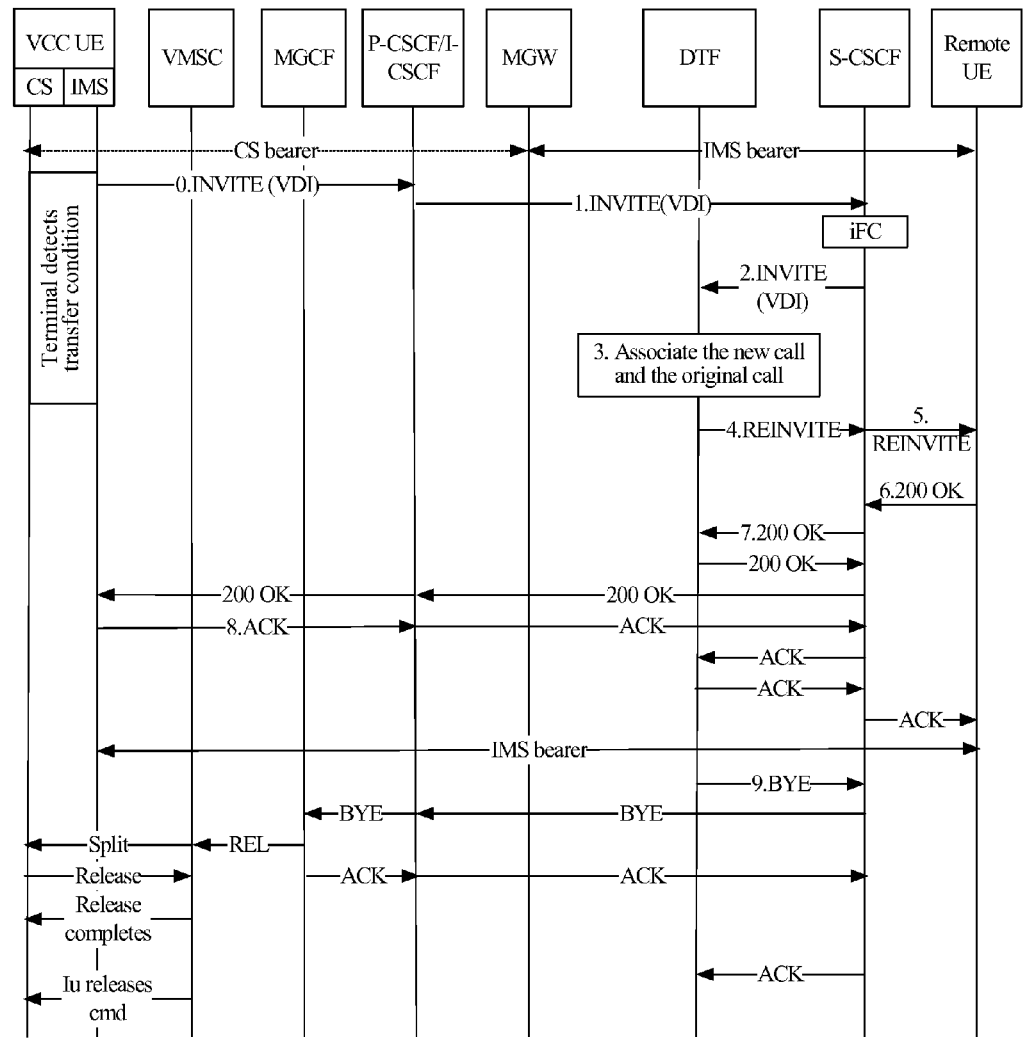
FIG. 3 is a flow chart of transferring a call from a CS domain to an IMS domain in the existing VCC.
Figure 4:
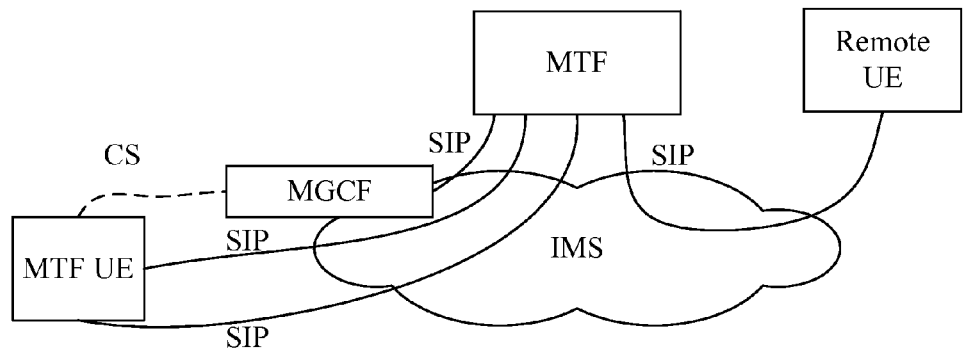
FIG. 4 is a schematic structural view of a system, according to an embodiment of the present invention.

In an embodiment of the present invention, a system for implementing multimedia call continuity is provided. Referring to FIG. 4, the system includes a multi-mode terminal media transfer function (MTF) UE, a MTF, and a remote UE. Further, an interworking functional entity may also be included between the MTF UE and the MTF.

The MTF UE supports transfer of at least one media flow component in a multimedia session between multiple modes and carries media flow transfer context information in an initiated media flow transfer request. Moreover, as knowing that a network side completes the media renegotiation according to the media flow transfer context information, the MTF or the MTF UE initiates releasing a media flow to be transferred before a media renegotiation.

Access mode: The MTF UE at least supports two access modes at the same time including, but not limited to, supporting accessing a CS domain network and accessing an IMS network at the same time.

Accessing the CS network is that the MTF UE initiates a media flow transfer request through a CS signaling, and then arrives the MTF after the interworking functional entity completing a conversion from the CS signaling to a session initiation protocol (SIP) signaling in the IMS network, thereby implementing an interaction between the MTF UE and the MTF. Accessing the IMS network is that the MTF UE interacts with the MTF through the SIP signaling.

The media flow transfer context information at least includes identification information of a media component to be transferred, information of a media flow component supported by the MTF UE in a transferred-in access network, and a replacement indication.

Initiating manner: As the MTF UE may know whether it needs to transfer to a session that has been established by the MTF UE in a transferred-in access network when initiating the media flow transfer request, the MTF UE can initiate the media flow transfer request in a corresponding manner. The MTF UE initiates the media flow transfer request in the following two manners.

1) When the media component is transferred to an existing session in the destination side access network, the MTF UE completes the transfer of the media flow component by initiating a media renegotiation on a transferred-in session.

2) When the media component needs to be transferred to a session newly established in the destination side access network, the MTF UE instructs to establish a session in the transferred-in access network to bear the media flow component to be transferred, so as to complete the transfer of the media flow component.

The MTF has several functions added thereto, based on the CSI AS function. Therefore, the MTF is adapted to identify the media flow transfer request sent by the MTF UE and identify the media component to be transferred and a media flow component supported by the MTF UE in the transferred-in network, according to the media flow transfer context information carried in the request, and then act as an agent to initiate and perform the media renegotiation with a remote UE, so as to establish the media flow supported by the MTF UE in the transferred-in network corresponding to the media component to be transferred. Moreover, a release of the media flow to be transferred before the media renegotiation may be initiated after the media renegotiation is completed (either of the MTF and the MTF UE initiates the release). In this manner, the replacement of "new" and "old" media flow components is implemented, and the media flow component is transferred.

In the specific implementation, the MTF is in a session path between the MTF UE and the remote UE through a 3rd party call control (3PCC) function (included, but not limited thereto). During the transfer of the media flow component, the MTF communicates with the MTF UE through the SIP signaling. When the MTF UE is in a CS domain mode, the communication is performed after converting the CS signaling and the SIP signaling by the interworking functional entity.

The interworking functional entity is adapted to convert a related CS signaling in the media flow transfer flow initiated by the MTF UE in the CS domain into a SIP signaling in the IMS domain and then send the SIP signaling to the MTF; and convert a SIP signaling sent by the MTF to the MTF UE in the IMS domain into a CS signaling and then send the CS signaling to the MTF UE.

In the specific implementation, the MTF has multiple deployment manners. The MTF may be an AS (including being used as an AS alone or co-located with other network elements (NEs) as an AS), and is ensured to be invoked by the network through an initial Filter Criteria (iFC) triggering mechanism. Or, the MTF is used as a transit entity for exchanging signaling between the MTF UE and the network. The system provided by the present invention is specifically illustrated below with six embodiments of the system.

Figure 5:
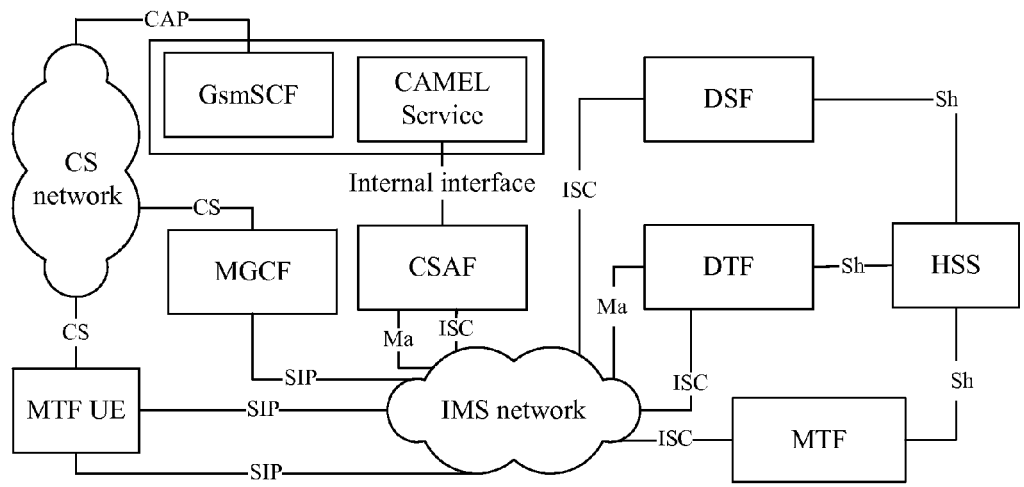
FIG. 5 is a schematic view of a system, according to a first embodiment of the present invention.

In a system according to a first embodiment, the MTF is used as a single AS, as shown in FIG. 5.

In the system of this embodiment, the MTF communicates with a home subscriber server (HSS) in the network by employing a Sh interface defined in the IMS network; the MTF communicates with other entities in the IMS network via an IMS service control (ISC) interface defined in the IMS network that employs the SIP protocol; the MTF delivers required information with the DTF using a SIP signaling by an S-CSCF; the gsmSCF interacts with the CAMEL Service by employing an internal interface; and the CAMEL service interacts with a CSAF by employing an internal interface. A media gateway control function (MGCF) belongs to an interworking functional entity of the CS signaling and the SIP signaling.

When the system of this embodiment is implemented, the MTF ensures that the MTF is always invoked at a location closer to the user than the DTF by the iFC triggering mechanism. That is, when the MTF UE acts as a caller, the MTF is invoked by the network before the DTF through the iFC triggering mechanism, and when the MTF UE acts as a callee, the MTF is invoked by the network after the DTF through the iFC triggering mechanism.

Figure 6:
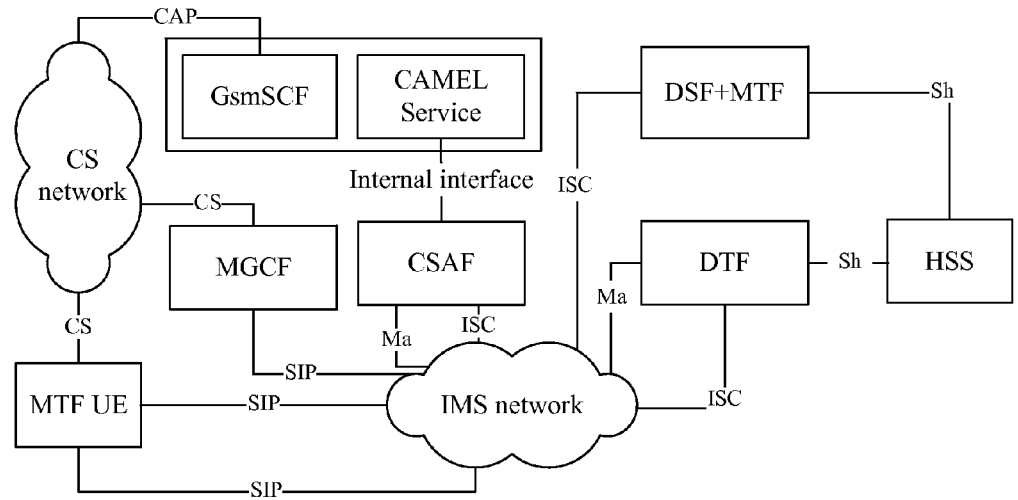
FIG. 6 is a schematic view of a system, according to a second embodiment of the present invention.

In a system according to a second embodiment, the MTF is co-located with the DSF as an AS, as shown in FIG. 6.

In the system of this embodiment, the MTF communicates with an entity in the IMS network through existing interfaces of the DSF, which are respectively the ISC and Sh; the gsm-SCF interacts with the CAMEL Service through an internal interface; and the CAMEL Service interacts with a CSAF through an internal interface. A MGCF belongs to an interworking functional entity of the CS signaling and the SIP signaling.

When the system of this embodiment is implemented, the MTF ensures that the AS where the MTF resides is always invoked at a location closer to the user than the DTF through the iFC triggering mechanism. That is, when the MTF UE acts as a caller, the MTF is invoked by the network before the DTF through the iFC triggering mechanism, and when the MTF UE acts as a callee, the MTF is invoked by the network after the DTF through the iFC triggering mechanism.

Figure 7:
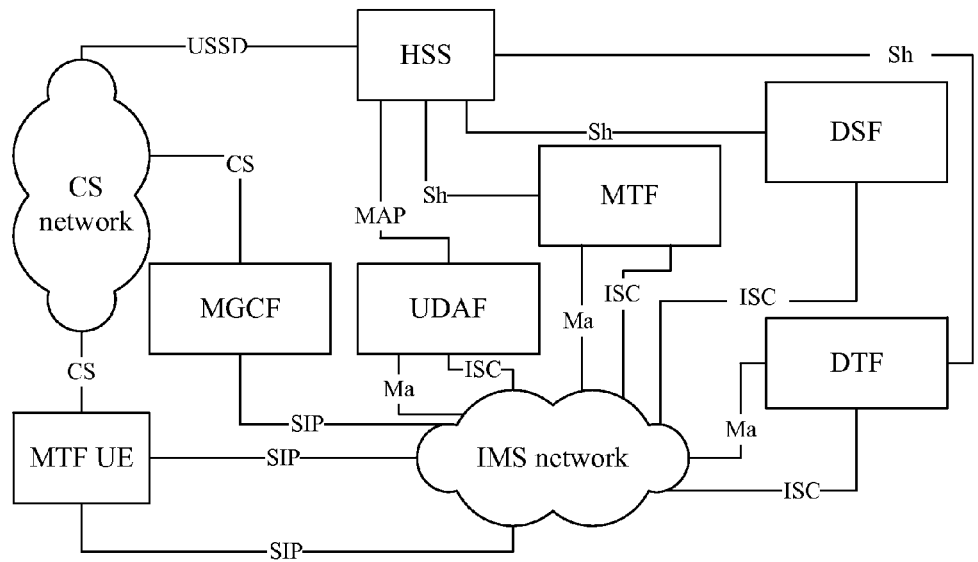
FIG. 7 is a schematic view of a system, according to a third embodiment of the present invention.

In a system according to a third embodiment, the MTF is used as a single AS, and the MTF UE supports unstructured supplementary service data (USSD) to deliver a service control signaling, as shown in FIG. 7.

In the system of this embodiment, the MTF communicates with a HSS by employing a Sh interface defined in the IMS specification, and the MTF communicates with a S-CSCF via an ISC interface defined in the IMS specification and delivers required transfer and session control information with the DTF via the ISC interface. Optionally, the MTF supports a Ma interface to address in a public service identity (PSI) manner.

A USSD adaptation function (UDAF) communicates with the HSS by employing the MAP or DIAMETER for delivering a USSD service control indication associated with a call established in the CS, for example, a media flow transfer request. The UDAF is responsible for converting the request into a SIP-suitable request. When the MTF UE is located in the user's home network, the USSD channel may be directly delivered between the visited mobile switching center (VMSC)/visitor location register (VLR) and UDAF without going through the HSS.

When the system of this embodiment is implemented, the MTF ensures that the MTF is always invoked at a location closer to the user than the DTF through the iFC triggering mechanism. That is, when the MTF UE acts as a caller, the MTF is invoked by the network before the DTF through the iFC triggering mechanism, and when the MTF UE acts as a callee, the MTF is invoked by the network after the DTF through the iFC triggering mechanism.

In the specific implementation, the following combination manners may also exist.

1. The UDAF and the MTF are combined into an AS; or
2. The MTF and the DSF are combined into an AS; or
3. The MTF, the DSF, and the DTF are combined into an AS; or 4. The UDAF, the MTF, and the DSF are combined into an AS; or 5. The UDAF, the MTF, the DSF, and the DTF are combined into an AS.

6. When the system of this embodiment is combined with the system of the first embodiment, the UDAF and the CSAF are combined into an AS, and the MTF and the DSF are combined into an AS.

Figure 8:
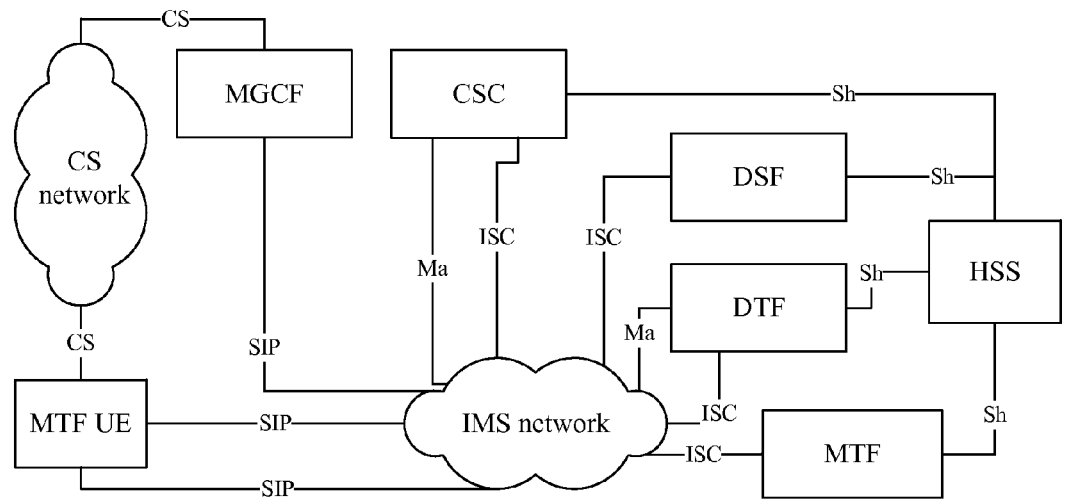
FIG. 8 is a schematic view of a system, according to a fourth embodiment of the present invention.

In a system according to a fourth embodiment, the MTF is used as a single AS, and the MTF UE supports the control of a call establishment and service control in the CS bearer through a SIP signaling of a PS access bearer, as shown in FIG. 8.

In the system of this embodiment, as an independent AS, the MTF communicates with a S-CSCF via an ISC interface defined in the 3GPP IMS specification, and delivers required transfer and session control information with the DTF via the ISC interface. Optionally, the MTF supports the Ma interface to be addressed by a PSI via this interface. Optionally, the MTF supports a Sh interface with a HSS.

The CS bearer control function (CSC) works in conjunction with the MTF UE to control the session establishment and service control on the UE CS bearer through the SIP signaling on the MTF UE PS access bearer. Optionally, a Sh interface with a HSS is supported. In order to control the call establishment on the CS bearer, the CSC is closer to the UE than the MTF.

When the system of this embodiment is implemented, the MTF is ensured to be always invoked at a location closer to the UE than the DTF through the iFC triggering mechanism. That is, when the MTF UE acts as a caller, the MTF is invoked by the network before the DTF through the iFC triggering mechanism, and when the MTF UE acts as a callee, the MTF is invoked by the network after the DTF through the iFC triggering mechanism. In a similar way, the CSC is ensured to be invoked at a location closer to the UE than the MTF. In the specific implementation, the following combination manners still exist.

The CSC and the MTF are combined into an AS; or

2. The CSC, the DSF, and the MTF are combined into an AS; or

3. The MTF, the CSC, the DSF, and the DTF are combined into an AS; or

4. The system of this embodiment may also be combined with the system of the first embodiment, and the CSC and the MTF are combined into an AS; or 5. The system of this embodiment may also be combined with the system of the first embodiment, and the CSC, the MTF, and the DSF are combined into an AS; or 6. The system of this embodiment may also be combined with the system of the first embodiment, and the CSC, the MTF, the DSF, and the DTF are combined into an AS.

Figure 9:
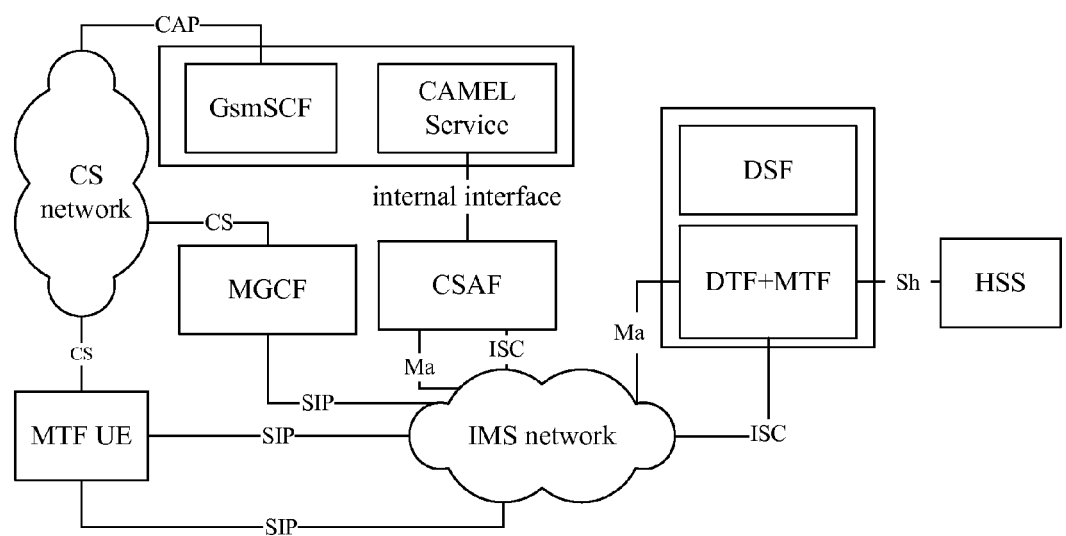
FIG. 9 is a schematic view of a system, according to a fifth embodiment of the present invention.

In a system according to a fifth embodiment, the MTF is co-located with the DTF as an AS, as shown in FIG. 9.

In the system of this embodiment, the DTF and the DSF employ an internal interface. The MTF communicates with an entity in the IMS network through existing interfaces in the DTF that are, respectively, an ISC, a Sh, and a Ma; the gsmSCF interacts with the CAMEL Service through an internal interface; and the CAMEL service interacts with the CSAF through an internal interface. The MGCF belongs to an interworking functional entity of the CS signaling and the SIP signaling.

When the system of this embodiment is implemented, the MTF is invoked by the network when the call reaches the co-located NE through the iFC triggering mechanism.

Figure 10:
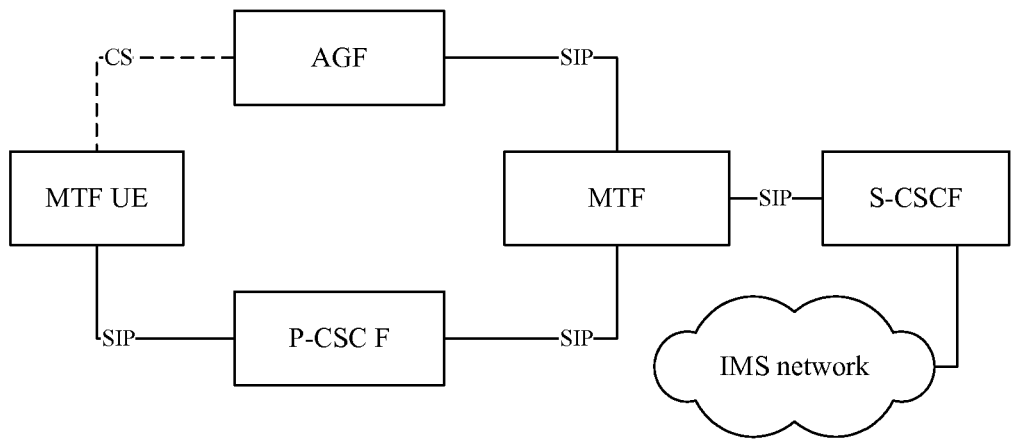
FIG. 10 is a schematic view of a system, according to a sixth embodiment of the present invention.

In a system according to a sixth embodiment, the MTF is used as a transit entity for exchanging signaling between the MTF UE and the network, as shown in FIG. 10.

In the system of this embodiment, the MTF is inserted between service routes of the P-CSCF and the S-CSCF through a special registration flow, and naturally can be inserted into any call path originated and terminated by the MTF UE. An access gateway function (AGF) is responsible for the conversion of the call signaling and the SIP signaling in the CS domain.

The special registration flow is, for example, configuring data at the S-CSCF. After receiving a registration request from the user and completing an authentication, the S-CSCF carries an address of the MTF UE to register with the MTF. After the registration is completed, the address of the MTF is returned to the MTF UE as an address of the S-CSCF, and the S-CSCF clears previous registration information of the user. The MTF then acts as an agent of the user to initiate a registration with the S-CSCF. The S-CSCF adopts the address of the MTF as the address of the MTF UE. In this manner, the MTF is between the MTF UE and the S-CSCF.

When the system of this embodiment is implemented, the call is invoked by the network when reaching the MTF.

Figure 11:
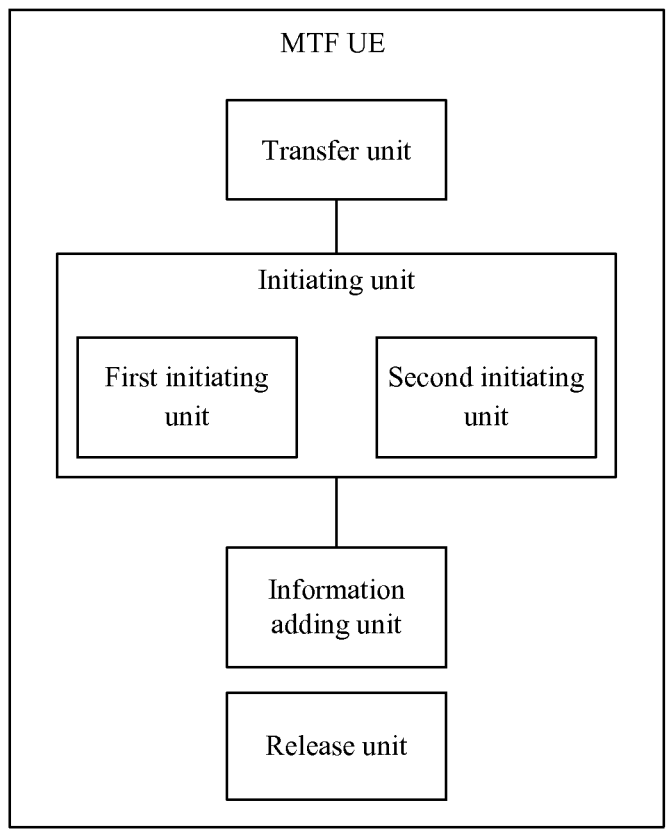
FIG. 11 is a schematic structural view of a multi-mode terminal MTF UE, according to an embodiment of the present invention.

Based on the above system, a multi-mode terminal (i.e. the MTF UE) is further provided in an embodiment of the present invention. Referring to FIG. 11, the multi-mode terminal includes a transfer unit, an initiating unit, and an information adding unit connected in sequence, and further includes a release unit. Corresponding to specific initiating manners, the initiating unit further includes a first initiating unit and a second initiating unit.

The transfer unit is adapted to support a media flow at a local end to be transferred between multiple modes.

The initiating unit is adapted to initiate a media flow transfer request to a network side according to an indication of the transfer unit.

The first initiating unit in the initiating unit is adapted to indicate a transfer of a media flow component that needs to be transferred to an existing session in a transferred-in network.

The second initiating unit in the initiating unit is adapted to indicate an establishment of a call in the transferred-in network so as to bear the media flow component to be transferred.

The information adding unit is adapted to add media flow transfer context information in the media flow transfer request initiated by the initiating unit.

The release unit is adapted to release the media flow to be transferred before a media renegotiation after knowing that the network side completes the media renegotiation, according to the media flow transfer context information added by the information adding unit.

Figure 12:
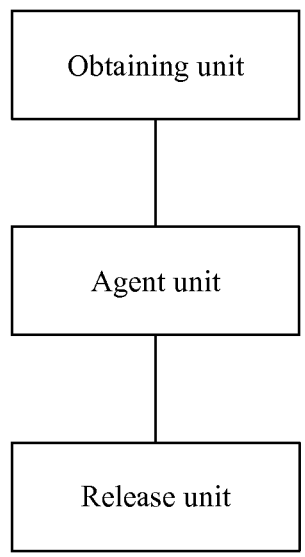
FIG. 12 is a schematic structural view of a MTF, according to an embodiment of the present invention.

Based on the above system, a media transfer function (i.e. the MTF) is further provided in an embodiment of the present invention. Referring to FIG. 12, the MTF includes an obtaining unit, an agent unit, and a release unit connected in sequence.

The obtaining unit is adapted to identify and obtain media flow transfer context information from a media flow transfer request initiated by a MTF UE.

The agent unit is adapted to act as an agent to initiate and perform a media renegotiation with a remote UE, according to the media flow transfer context information obtained by the obtaining unit.

The release unit is adapted to release a media flow to be transferred before the media renegotiation after the agent unit completes the media renegotiation.

Figure 13:
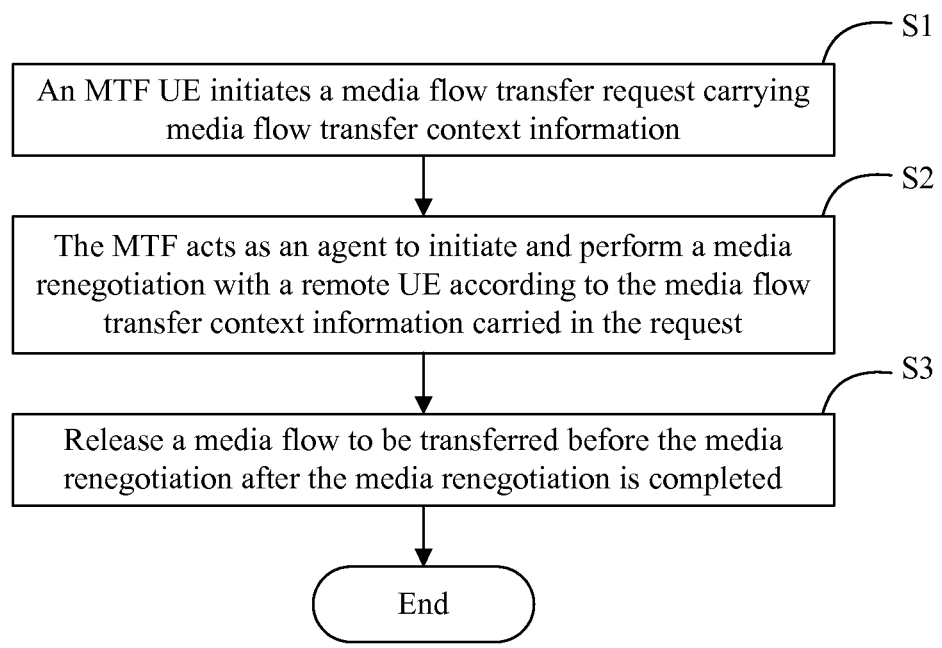
FIG. 13 is a flow chart illustrating steps of a method, according to an embodiment of the present invention.

Based on the above system, a method for implementing multimedia call continuity is further provided in an embodiment of the present invention. Referring to FIG. 13, the method mainly includes the following steps.

In S1, a MTF UE initiates a media flow transfer request carrying media flow transfer context information.

In this step, the MTF UE initiates the media flow transfer request in one of the following manners.

The MTF UE indicates a transfer of a media flow component that needs to be transferred to an existing session in a destination side network.

The MTF UE indicates an establishment of a call in the transferred-in access network so as to bear the media flow component to be transferred.

The carried media flow transfer context information at least includes: identification information of a media component to be transferred, information of a media flow component supported by the MTF UE in the transferred-in network, and a replacement indication.

1) The identification information of the media component to be transferred is adapted to identify which media component is to be transferred. A specific implementation thereof is an independent media component ID (i.e. SDP information of the media component), for example, an IP address and port number information of a processing media; or a combination of an existing session ID and the media component ID.

2) The information of the media flow component supported by the MTF UE in the transferred-in network includes, but not limited to, media format information and media port information.

3) The replacement indication denotes a replacement of the media component to be transferred with the media flow component supported by the MTF UE in the transferred-in network corresponding to the media component to be transferred.

In the specific implementation, the media flow transfer context information is carried by extending a header field, a parameter, or a message body in a SIP session request in an IMS domain, so as to deliver the media flow transfer context information to the MTF. The following cases may further exist.

In a first case, if the MTF UE initiates the media flow transfer request in the IMS domain, the media flow transfer context information is carried in the request when the SIP session request is assembled.

In a second case, if the MTF UE initiates the media flow transfer request in a CS domain, the MTF UE delivers the media flow transfer context information to the MTF, which includes the following steps. The MTF UE carries the above information in a user-to-user (User2User) information element of a domain transfer request. After receiving the request, a VMSC triggers the request to a CAMEL application entity (CAMEL Service) of a user for storage through a User2User information element in an IDP message of a CAMEL. When the domain transfer request in the CS domain is routed to the IMS domain, a CSAF interacts with the CAMEL Service to obtain the information and then carries the information in a SIP session request message when assembling the message. The carrying manner is the same as that when the information is delivered in the IMS domain. Afterwards, the information is triggered to the MTF in the SIP session request message so as to be delivered from the MTF UE to the MTF.

Or, if the MTF UE initiates the media flow transfer request in a CS domain, the MTF UE delivers the media flow transfer context information to the MTF, which includes the following steps. The MTF UE carries the above information in a User2User information element of a domain transfer request. After receiving the request, a VMSC delivers the cell through an network-network interface signaling, for example, an integrated services digital network user part (ISUP), a bearer independent call control (BICC), etc., then converts the information element into any form or combination of a parameter, a header field, or a message body in a SIP signaling by an IMS network interworking entity MGCF, and finally delivers the transfer context information to the MTF through the SIP signaling.

Or, if the MTF UE initiates the media flow transfer request in a CS domain, the MTF UE delivers the media flow transfer context information to the MTF, which includes the following steps. The MTF UE carries the above information in a User2User information element of a domain transfer request. After receiving the request, an AGF converts the cell into any form or combination of a parameter, a header field, or a message body in a SIP signaling, and finally delivers it to the MTF through the SIP signaling.

In S2, the MTF acts as an agent to initiate and perform a media renegotiation with a remote UE, according to the media flow transfer context information carried in the request.

In this step, first, the MTF identifies that the MTF UE initiates the media flow transfer request, according to the replacement indication carried in the request. Then, the MTF associates a session leg of the remote UE (remote leg), according to a known access side session ID (i.e. an access leg ID of the media flow to be transferred), and acts as an agent to initiate and perform the media negotiation with the remote UE on the remote leg (i.e. renegotiates the remote leg) based on the information of the media flow component supported by the MTF UE in the transferred-in network corresponding to the identification information of the media component to be transferred.

In S3, a media flow to be transferred before the media renegotiation is released after the media renegotiation is completed.

After the media renegotiation succeeds, the media flow to be transferred before the media renegotiation is released (i.e. an access leg of the media flow to be transferred is released), so as to correspondingly replace the media component to be transferred with the media flow component supported by the MTF UE in the transferred-in network.

The releasing the media flow to be transferred before the media renegotiation includes one of the following manners.

If an original session retains at least two media flow components, the MTF or the MTF UE initiates the media renegotiation, and releases the media flow to be transferred through the media renegotiation between the MTF and the MTF UE.

If an original session retains one media flow component, the MTF or the MTF UE initiates a release of the original session so as to release the media flow to be transferred.

The present invention is illustrated below with nine embodiments.

Figure 14:
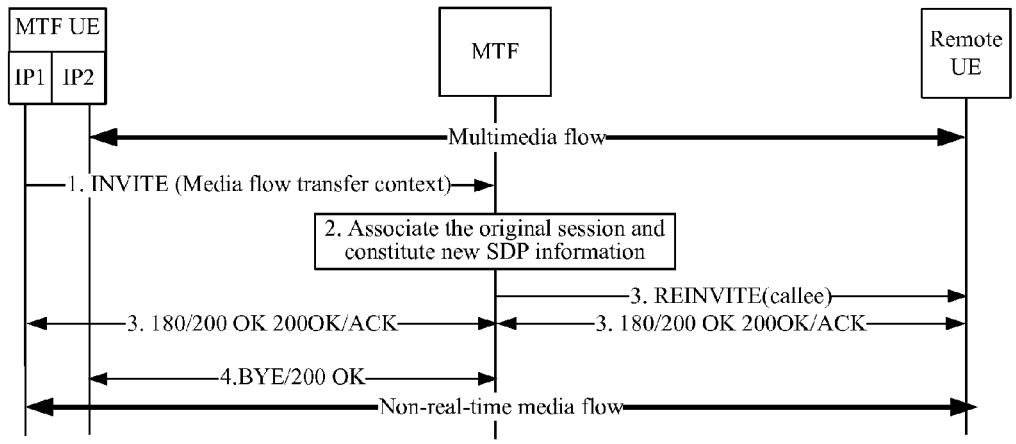
FIG. 14 is a signaling flow chart of a method, according to a first embodiment of the present invention.

In a method according to a first embodiment, a non-real-time media is transferred from an IP-CAN2 to an IP-CAN1 (Note: 1. This embodiment takes a non-real-time media flow transfer as an example, and may also be applied to a real-time media flow transfer; 2. The media renegotiation takes REINVITE as an example, and may also employ other SIP method, for example, UPDATE; 3. The mode may be applied to any system deployment manners that are described above; 4. This embodiment only shows key processing entities, but does not include all network entities; 5. The media negotiation with the remote end and the establishment process of a new session in the destination network may be in other orders, and this embodiment only provides a preferred implementation manner; and 6. When the media is transferred to the CS, the initiation and delivery of the transfer request thereof may be implemented by methods shown in the third, fourth, fifth, sixth, and seventh embodiments). Referring to FIG. 14, the precondition is that, a MTF UE has carried out an IMS multimedia session with a remote UE in an IP2 access manner, and a MTF entity has been anchored in a call path. The method includes the following steps.

1. The MTF UE determines that the non-real-time media needs to be transferred from the IP-CAN2 to the IP-CAN1 bearer, so that the MTF UE initiates a call in the transferred-in network and carries a media flow transfer context.

2. When the MTF is implemented as an AS, a S-CSCF in an IMS network triggers the call to the MTF for processing through an iFC; and when the MTF is located between the P-CSCF/AGF and the S-CSCF, as the MTF has been inserted into the signaling path during the registration, a call request sent by the MTF UE can be obtained naturally. On receiving the call request, the MTF constitutes a new SDP on a remote leg after the MTF replaces old non-real-time media information with new non-real-time media information, according to the media flow transfer context.

3. The MTF acts as an agent of a user to initiate the media renegotiation with a remote user on the remote leg and a subsequent flow of the media renegotiation.

4. After the non-real-time media flow on the new bearer is established, the MTF releases an original session where the non-real-time media resides. (Note: This embodiment takes a release of the original session where the non-real-time media resides as an example, but may also delete the transferred media through the media negotiation process on the original session.)

Figure 15:
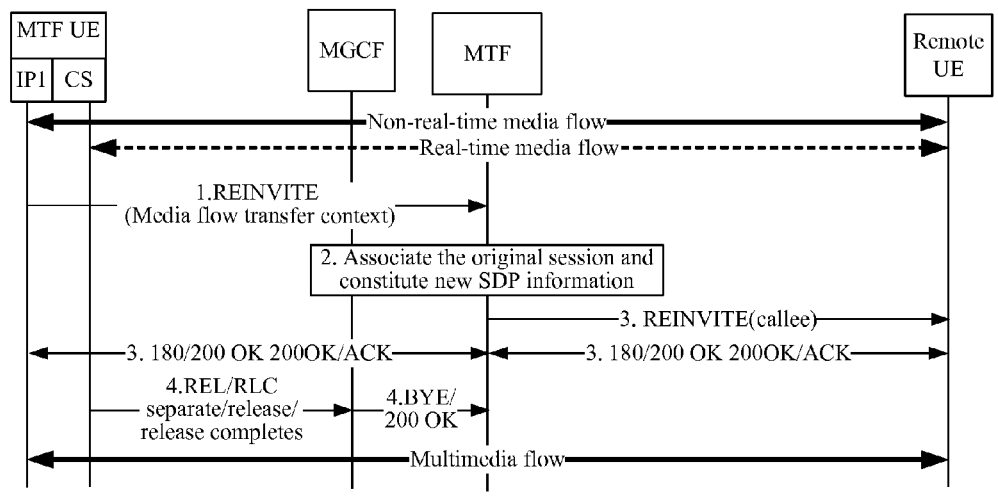
FIG. 15 is a signaling flow chart of a method, according to a second embodiment of the present invention.

In a method according to a second embodiment, a real-time media is transferred from a CS to an existing session on an IP-CAN1 (Note: 1. This embodiment takes a real-time media transfer as an example, but may also be applied to a non-real-time media transfer; 2. The media renegotiation takes REINVITE as an example, but may also employ other SIP media change flows, for example, UPDATE; 3. The mode may be applied to any system deployment manners that are described above; 4. This embodiment only shows key processing entities, and does not include all network entities; and 5. The media negotiation with the remote end and the establishment process of a new session in a transferred-in network may be in other orders, and this embodiment only provides a preferred implementation manner). Referring to FIG. 15, the precondition is that, a MTF UE has carried out an associated IMS multimedia session with a remote UE in an IP1 and CS access manner, and a MTF entity has been anchored in a call path. The method includes the following steps.

1. The MTF UE determines that the real-time media needs to be transferred from the CS to the existing non-real-time session on the IP-CAN1 bearer, and thus the MTF UE initiates a media flow renegotiation in the transferred-in network and carries a media flow transfer context.

2. When the MTF is implemented as an AS, a S-CSCF in an IMS network triggers the call to the MTF for processing through an iFC; and when the MTF is located between the P-CSCF/AGF and the S-CSCF, as the MTF has been inserted into the signaling path during the registration, a call request sent by the MTF UE can be obtained naturally. On receiving the call request, the old real-time media information is replaced with new real-time media information, according to the media flow transfer context, and new SDP information on a remote leg is constituted.

3. The MTF acts as an agent of a user to initiate the media renegotiation with a remote user and a subsequent flow of the media renegotiation.

4. After the real-time media flow on the new bearer is established, the MTF releases an original session where the real-time media resides.

Figure 16:
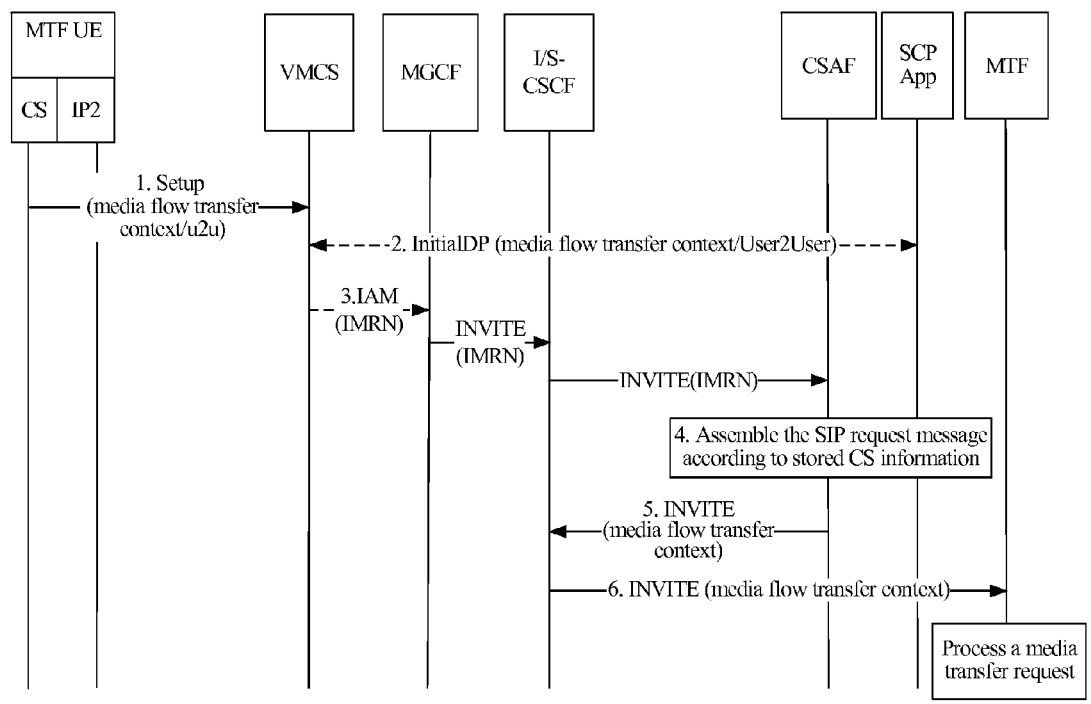
FIG. 16 is a signaling flow chart of a method, according to a third embodiment of the present invention.

In a method according to a third embodiment, a manner in which a media flow transfer context is delivered to an MTF in a CS access is provided (Note: 1. This embodiment may be applied to the systems of the first, second, and fifth embodiments; 2. This embodiment only shows key processing entities, and does not include all network entities; and 3. A MTF UE at least supports the CS and one IP access manner). Referring to FIG. 16, the method includes the following steps.

1. The MTF UE carries a media flow transfer context in a User2User information element to be delivered to an end office VMSC for processing via a user network interface.

2. The VMSC delivers, through a CAMEL IDP message, information received from the User2User cell to a SCP application (here, the SCP App denotes the whole of the gsmSCP and CAMEL Service entities, and the CAMEL message should be first triggered to the gsmSCP and then delivered to the CAMEL Service via an internal interface) in a home IMS network of the user, according to a user subscription. The SCP App itself allocates a routing number of the IMS routing number (IMRN) or interacts with a CSAF to allocate the IMRN, and returns the IMRN to the VMSC in an IDP response message.

3. The VMSC routes the call to a gateway MGCF of the IMS network, according to the redirected number. The MGCF forwards the call to the CSAF entity by employing a Ma interface through an interrogating-CSCF (I-CSCF).

4. The CSAF interacts with the SCP application to obtain stored CS domain information when receiving a call routed from the CS domain, and assembles the above information to an appropriate SIP information field.

5. The CSAF forwards the call to the S-CSCF for processing.

6. The S-CSCF triggers the call to an AS where the MTF resides, according to an iFC.

Figure 17:
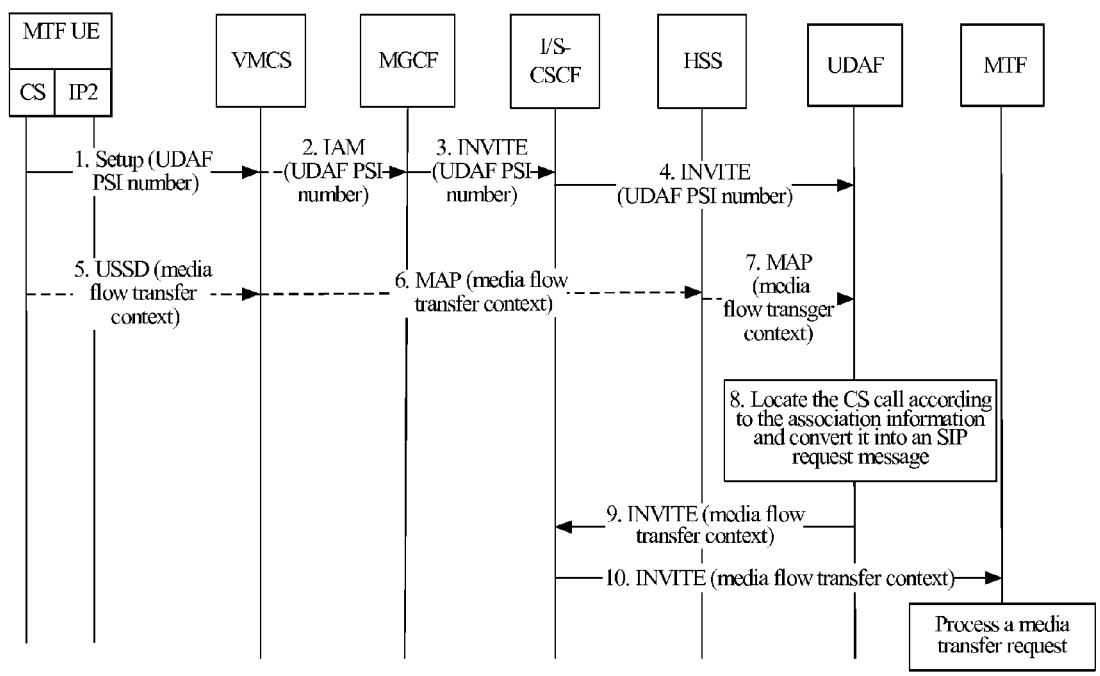
FIG. 17 is a signaling flow chart of a method, according to a fourth embodiment of the present invention.

In a method according to a fourth embodiment, a second manner in which a media flow transfer context is delivered to a MTF in a CS access is provided (Note: 1. This embodiment may be applied to the system of the third embodiment; 2. This embodiment only shows key processing entities, and does not include all network entities; 3. The MTF UE at least supports the CS and one IP access manner; and 4. This flow with small changes may also be applied to other possible manners of the system, according to the third embodiment). Referring to FIG. 17, the method includes the following steps.

1. The MTF UE calls a PSI number corresponding to a UDAF in a CS network after determining that a media is to be transferred to the CS network.

2-4. According to this PSI number, the call is routed to an IMS network, and the call is forwarded to the UDAF for processing by performing a PSI routing through an I-CSCF (other PSI routing manners may also be adopted).

5. The MTF UE sends a USSD message to the UDAF to carry a media flow transfer context and association information with the call established in the previous steps to be delivered to the VMSC for processing via a user network interface.

6-7. According to the routing manner of a USSD application, a HSS forwards this request to the UDAF for processing (here, the roaming of the MTF UE is taken as an example; and if the MTF UE is in the home domain, the request may not go through the HSS).

8. The UDAF finds the call to be processed according to the association information, and then assembles the media flow transfer context in a SIP request according to transfer context information (i.e. according to the received media flow transfer context information that is carried by the MTF UE in the USSD message, and the UDAF maps the information into a media transfer request in the SIP session).

9-10. The UDAF triggers the call to an AS where the MTF resides according to an iFC after forwarding the call to the S-CSCF.

Figure 18:
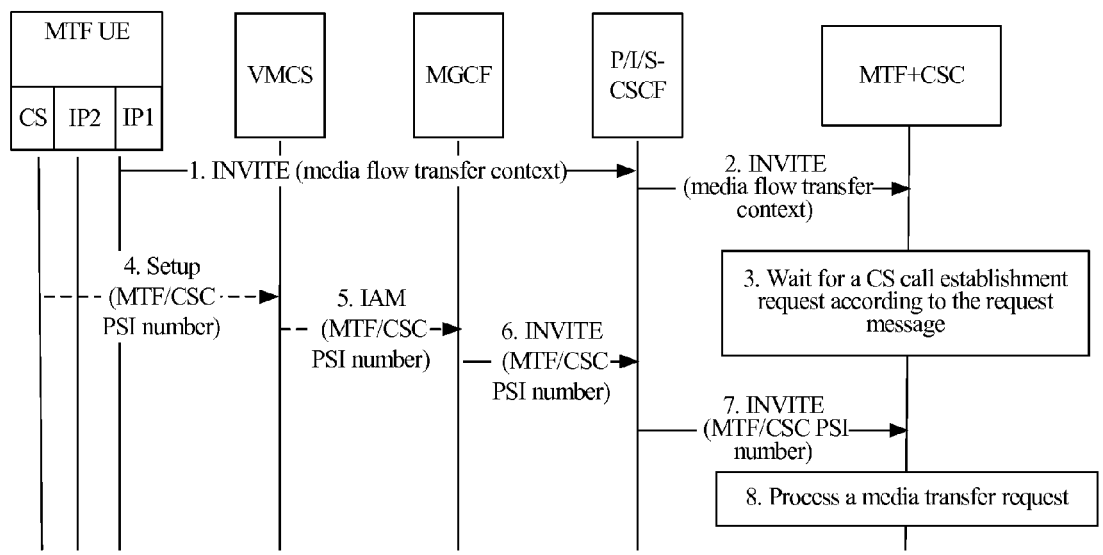
FIG. 18 is a signaling flow chart of a method, according to a fifth embodiment of the present invention.

A method according to a fifth embodiment, a manner in which a media flow transfer context is delivered to a MTF in a PS access is provided (Note: 1. This embodiment may be applied to the system of the fourth embodiment; 2. This embodiment only shows key processing entities, and does not include all network entities; 3. The MTF UE at least supports the CS and one IP access manner; and 4. This flow with small changes may also be applied to other possible manners of the system, according to the fourth embodiment). The precondition is that, the MTF UE and a serving network thereof support the control of a CS session establishment through a signaling borne by the PS. Referring to FIG. 18, the method includes the following steps.

1. The MTF UE calls a special called number (for example, VDI) in a PS network after determining that a media is to be transferred to a CS network, and carries media flow transfer context information denoting that a media is transferred to the CS.

2. The IMS network triggers the call request to an AS where a MTF/CSC resides for processing, according to matching of a caller iFC.

3. The MTF/CSC determines that still a real-time media is to be transferred, and waits for a session establishment request on a CS bearer so as to associate the two session requests. Optionally, the MCC/CSC, for example, allocates a dynamic transfer number VDN by carrying association information between a CS session and a PS session on the IP1 in a backward response of the IP1 session establishment request, for example, 183. The number may be a PSI number in the IMS network towards the AS where the MTF/CSC resides.

4-7. After receiving the response, the MTF UE employs the allocated transfer number as the called number. As the called number is the PSI number of the MTF/CSC, the call request may be forwarded to an AS where the MCC/CSC resides for processing (When the two sessions are associated through a calling number and a transfer indication, the transfer routing number may be configured in the MCC UE without waiting for a dynamic allocation of the network; and at this time, the 4th step and the 1st step are performed concurrently to reduce an establishment delay of a transfer signaling).

8. After receiving the CS session request, the MTF/CSC locates a session request on the PS, according to the aforementioned association method, and performs a media transfer processing according to the media flow transfer context information therein.

Figure 19:
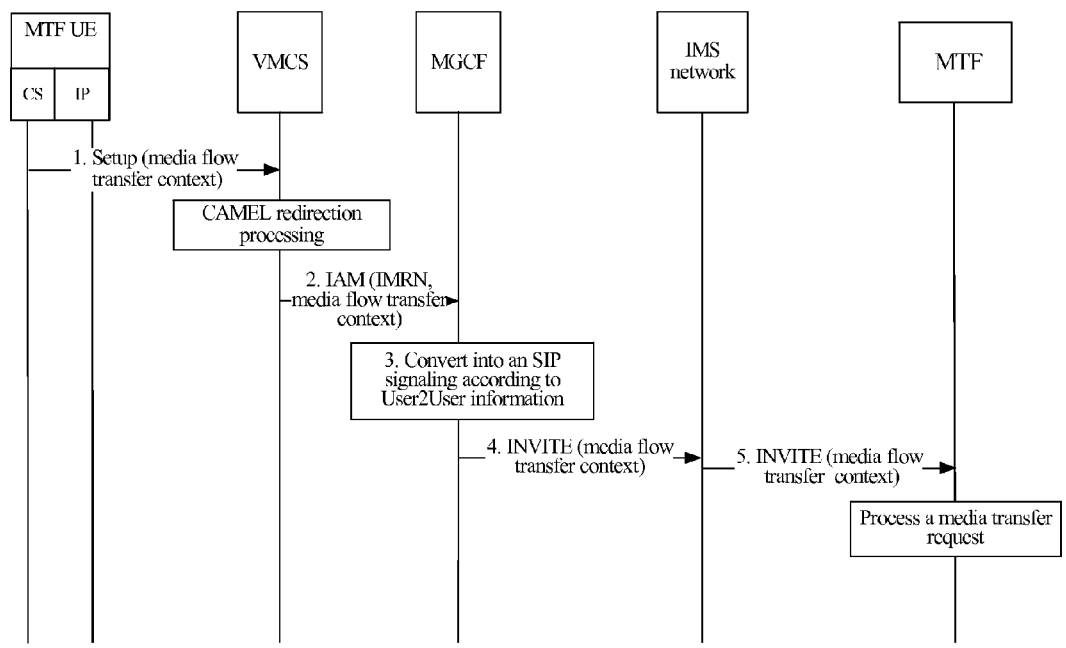
FIG. 19 is a signaling flow chart of a method, according to a sixth embodiment of the present invention.

A method according to a sixth embodiment, a third manner in which a media flow transfer context is delivered to a MTF in a CS access is provided (Note: 1. This embodiment may be applied to the systems of the first, second, and fifth embodiments; 2. This embodiment only shows key processing entities, and does not include all network entities; and 3. A MTF UE at least supports the CS and one IP access manner). Referring to FIG. 19, the method includes the following steps.

1. The MTF UE carries a media flow transfer context in a User2User information element to be delivered to an end office VMSC for processing via a user network interface.

2. The VMSC assembles the received User2User cell to a User2User information element in a NNI signaling (ISUP or BICC), and forwards the call to an MGCF for processing, according to a CMAEL redirection processing.

3. The MGCF converts the User2User information unit into a parameter, a header field, or a message body of a SIP session request, and then assembles the request into a SIP message.

4-5. The SIP session request is routed to an IMS network, and the IMS network triggers the call to an AS where the MTF resides, according to a caller iFC.

Figure 20:
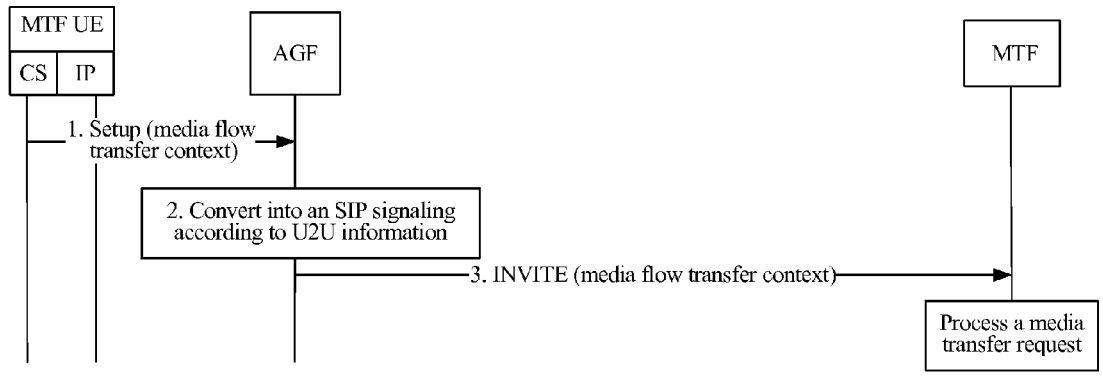
FIG. 20 is a signaling flow chart of a method, according to a seventh embodiment of the present invention.

A method according to a seventh embodiment, a fourth manner in which a media flow transfer context is delivered to an MTF in a CS access is provided (Note: 1. This embodiment may be applied to the system of the sixth embodiment; and 2. This embodiment only shows key processing entities, and does not include all network entities). Referring to FIG. 20, the method includes the following steps.

1. The MTF UE carries a media flow transfer context in a User2User cell and delivers the cell to an AGF for processing via a user network interface.

2. The AGF converts the received User2User cell into a parameter, a header field, or a message body of a SIP session request, and then assembles the request into a SIP message.

3. The AGF forwards the SIP session request to a home IMS network of the user according to registration information, and a related entity of the IMS network, for example, a S-CSCF, triggers the call to the MTF for processing, according to a caller iFC.

Figure 21:
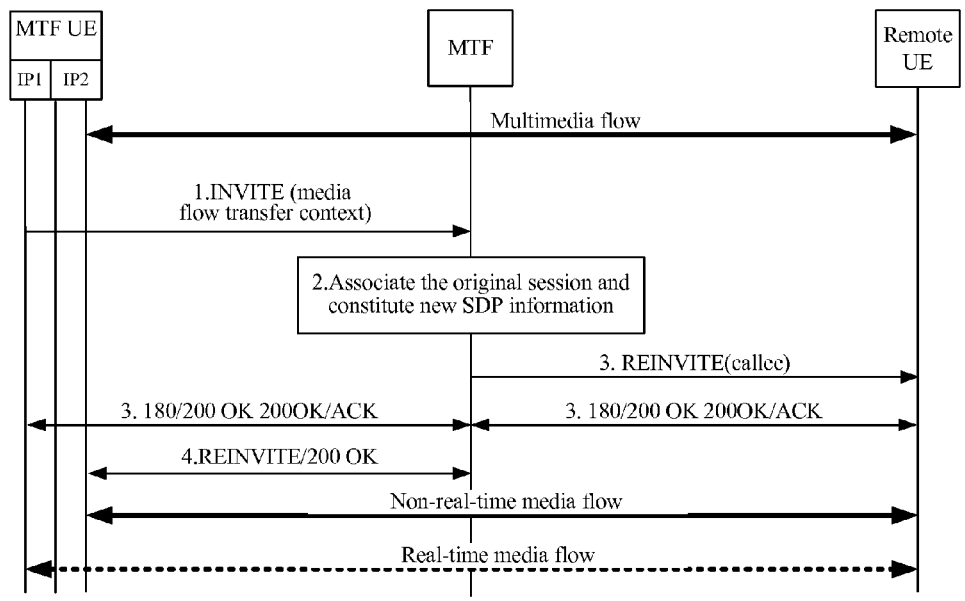
FIG. 21 is a signaling flow chart of a method, according to an eighth embodiment of the present invention.

In a method according to an eighth embodiment, a release processing in which a real-time media in a multimedia session is transferred from an IP-CAN2 to an IP-CAN1 is provided (Note: 1. The release processing in this embodiment may be applied to any transfer mode (including the modes in the methods of the first and second embodiments) or applied to a non-real-time media transfer in a multimedia session; 2. The media renegotiation takes REINVITE as an example, but may also apply other SIP media change flows, for example, UPDATE; 3. This embodiment only shows key processing entities, and does not include all network entities; and 4. The media negotiation with the remote end and the establishment process of a new session in a destination network may be in other orders, and this embodiment only provides a preferred implementation manner). Referring to FIG. 21, the precondition is that, a MTF UE has carried out an IMS multimedia conversation with a remote UE in an IP2 access manner, and a MTF entity has been anchored in a call path. The method includes the following steps.

1-3. A media negotiation flow in which the real-time media in the multimedia session is transferred from the IP-CAN2 to the IP-CAN1 is performed.

4. The MTF releases the real-time media to be transferred by performing the media renegotiation on the original session after a real-time media flow on the new bearer is established (or, the MTF UE initiates the renegotiation to release the media that has been transferred in the multimedia session after detecting a media channel switch).

Figure 22:
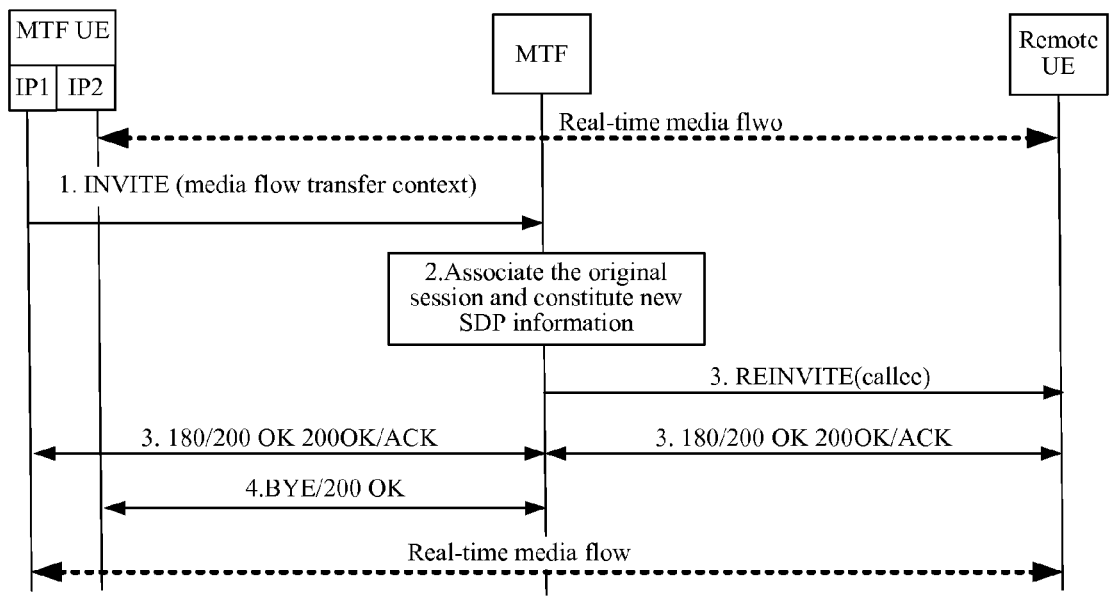
FIG. 22 is a signaling flow chart of a method, according to a ninth embodiment of the present invention.

In a method according to a ninth embodiment, a release processing in which a session of a real-time media is transferred from an IP-CAN2 to an IP-CAN1 is provided (Note: 1. The release processing in this embodiment may be applied to any transfer mode (including the modes in the methods of the first and second embodiments) or applied to a non-real-time media transfer in a multimedia session; 2. The media renegotiation takes REINVITE as an example, but may also apply other SIP media change flow, for example, UPDATE; 3. This embodiment only shows key processing entities, and does not include all network entities; 4. The media negotiation with the remote end and the establishment process of a new session in a destination network may be in other orders, and this embodiment only gives a preferred implementation manner; and 5. The MTF UE at least includes two IP access manners). Referring to FIG. 22, the precondition is that, a MTF UE has carried out an IMS session including the real-time media with a remote UE in an IP2 access manner, and a MTF entity has been anchored in a call path. The method includes the following steps.

1-3. A media negotiation flow in which the real-time media in the multimedia session is transferred from the IP-CAN2 to the IP-CAN1 is performed.

4. The MTF releases the original session after a real-time media flow on the new bearer is established (or, the MTF UE initiates a release of the original session where the media that has been transferred resides after detecting a media channel switch).

In view of the above, a system, method, and apparatus for implementing multimedia call continuity are provided in the embodiments of the present invention. The multi-mode terminal MTF UE supports media flow transfer between multiple modes and may carry media flow transfer context information in an initiated media flow transfer request. The media flow transfer context information at least includes: identification information of a media component to be transferred, information of a media flow component supported by the MTF UE in the transferred-in access network, and a replacement indication. The MTF acts as an agent to initiate and perform a media renegotiation with a remote UE based on the information of the media flow component supported by the MTF UE in the transferred-in network corresponding to the identification information of the media component to be transferred. After the media renegotiation succeeds, the media flow to be transferred is released, thereby implementing the media flow transfer between bearers of different access modes.

In the embodiments of the present invention, the problem of the media flow transfer between bearers of different access modes of the multi-mode terminal is solved by adding the MTF without influencing the existing flow of the VCC, the mobile experience of the user is improved, and the competitiveness of the operator in network mobility services is also enhanced.

Though illustration and description of the present disclosure have been given by reference to exemplary embodiments thereof, it should be appreciated by persons of ordinary skills in the art that various changes in forms and details can be made without deviation from the spirit and scope of this disclosure, which are defined by the appended claims.

What is claimed is:

1. A media transfer function (MTF) user equipment (UE), comprising:
   a transfer unit adapted to support transfer of media flows between multiple access networks;
   an initiating unit adapted to initiate a media flow transfer request to a network side, according to an indication of the transfer unit;
   an information adding unit adapted to add media flow transfer context information in the media flow transfer request initiated by the initiating unit, the media flow transfer context information at least comprises: identification information of one of media components to be transferred, information of a media flow component supported by the MTF UE in a transferred-in access network, and a replacement indication; and
   a release unit adapted to release the media flow to be transferred before a media renegotiation after knowing that the network side implements the media renegotiation, according to the media flow transfer context information added by the information adding unit.

2. The MTF UE according to claim 1, wherein the initiating unit further comprises:
   a first initiating unit adapted to instruct to transfer the media components to an existing session in a transferred-in network; and
   a second initiating unit adapted to instruct to transfer the media components to a session newly established in the transfer-in network so as to bear the media flow component to be transferred.

3. A system for implementing multimedia call continuity, comprising:
   a remote user equipment (UE), a media transfer function (MTF) UE and an MTF; wherein the MTF UE, supporting a media flow transfer between multiple access networks, is adapted to initiate a media flow transfer request carrying media flow transfer context information to the MTF,
   the media flow transfer context information at least comprises:
   identification information of a media component to be transferred, information of a media flow component supported by the MTF UE in a transferred-in access network, and a replacement indication;
   the MTF is adapted to perform a media renegotiation with the remote UE according to the media flow transfer context information carried in the request; and
   wherein after the media renegotiation is completed, one of the MTF UE and the MTF releases the media flows to be transferred before the media renegotiation.

4. The system according to claim 3, further comprising an interworking functional entity between the MTF UE and the MTF adapted to convert a related circuit-switched (CS) signaling in a CS domain and a session initiation protocol (SIP) signaling in an Internet protocol (IP) multimedia system (IMS) domain for the media flow transfer initiated by the MTF UE.

5. The system according to claim 3, wherein the MTF is located in an application server (AS), and the MTF is ensured to be invoked through an initial Filter Criteria (iFC) triggering mechanism.

6. The system according to claim 5, wherein the system further comprises a domain transfer function (DTF) co-located with the MTF, the MTF is invoked when the call reaches the co-located AS through the iFC triggering mechanism.

7. A media transfer function (MTF), comprising:
   an obtaining unit adapted to obtain media flow transfer context information from a media flow transfer request initiated by an MTF user equipment (UE), the media flow transfer context information at least comprises: identification information of a media component to be transferred, information of a media flow component supported by the MTF UE in a transferred-in access network, and a replacement indication;
   an agent unit adapted to perform a media renegotiation with a remote UE, according to the media flow transfer context information obtained by the obtaining unit; and
   a release unit adapted to release the media flow to be transferred before the media renegotiation after the agent unit completes the media renegotiation.

8. A method for implementing multimedia call continuity, comprising:
   receiving, by a media transfer function (MTF), a media flow transfer request carrying media flow transfer context information initiated by a media transfer function user equipment (MTF UE), the media flow transfer context information at least comprises: identification information of a media component to be transferred, information of one of media flow components supported by the MTF UE in a transferred-in access network, and a replacement indication;

acting, by the MTF, as an agent to initiate and perform a media renegotiation with a remote user equipment (UE) according to the media flow transfer context information; and releasing a media flow to be transferred before the media renegotiation after knowing that a network side implements the media renegotiation, according to the media flow transfer context information.

9. The method according to claim 8, wherein the identification information of the media component to be transferred includes at least one of a combination of an existing session ID, a media component ID and an independent media component ID.

10. The method according to claim 8, wherein the MTF UE initiates the media flow transfer request in one of the following manners:

the MTF UE instructs to transfer at least one of the media flow components to be transferred to an existing session in a transferred-in access network; and the MTF UE indicates to newly establish a call in the transfer-in network so as to bear the media stream component to be transferred.

11. The method according to claim 8, wherein after the MTF receives the media flow transfer request, the method comprises:

identifying, by the MTF, the media flow transfer request initiated by the MTF UE, according to the replacement indication carried in the request;

acting, by the MTF, as an agent to initiate and perform the media renegotiation with the remote UE based on the information of the media flow component supported by the MTF UE in the transferred-in network corresponding to the identification information of the media component to be transferred; and releasing the media flow to be transferred in a transferred-out access network so as to complete the media flow transfer between the transferred-in access network and a transferred-out access network after the media renegotiation succeeds.

12. The method according to claim 8, wherein the releasing the media flow to be transferred before the media renegotiation comprises one of the following manners:

if at least two media flow components remains in an original session, one of the MTF and the MTF UE releases the media flow to be transferred through the media renegotiation between the MTF and the MTF UE; and if one media flow component remains in the original session, one of the MTF and the MTF UE initiates a release of the original session so as to release the media flow to be transferred.

13. The method according to claim 8, wherein in an Internet protocol (IP) multimedia system (IMS) domain, the media flow transfer context information is carried by extending at least one of a header field, a parameter, and a message body in a session initiation protocol (SIP) session request.

14. The method according to claim 13, wherein if the MTF UE initiates the media flow transfer request in a circuit-switched (CS) domain, the MTF UE delivers the media flow transfer context information to the MTF, which comprises:

carrying, by the MTF UE, the media flow transfer context information in a user-to-user (User2User) information element of a CS call setup request, and sending the CS call setup request to a network side;

triggering, by a visited mobile switching center (VMSC), the context information carried in the CS call setup request to a customized application for mobile network enhanced logic (CAMEL) application entity CAMEL Service Control Point (SCP) of a user for storage after receiving the CS call setup request;

when the media flow transfer request in the CS domain is routed to the IMS domain, interacting, by a CS adaptation function (CSAF) with the CAMEL Service to obtain the context information, and carrying the context information in the CS call setup request when assembling the SIP session request; and forwarding, by the CSAF, the SIP session request to the MTF via an IMS network.

15. The method according to claim 13, wherein the MTF UE initiates the media flow transfer request in a circuit-switched (CS) domain, the MTF UE delivers the media flow transfer context information to the MTF, which comprises:

carrying, by the MTF UE, the media flow transfer context information in a user-to-user (User2User) information element of the media flow transfer request, and sending the media flow transfer request to a network side;

forwarding, by a visited mobile switching center (VMSC), the media flow transfer request to a media gateway control function (MGCF) as an interworking functional entity through an network-network interface signaling after receiving the media flow transfer request;

converting, by the MGCF, the media flow transfer request into the SIP session request; and forwarding, by the MGCF, the SIP session request to the MTF via an IMS network.

16. The method according to claim 13, wherein the MTF UE initiates the media flow transfer request in a circuit-switched (CS) domain, the MTF UE delivers the media flow transfer context information to the MTF, which comprises:

carrying, by the MTF UE, the media flow transfer context information in a user-to-user (User2User) information element of the media flow transfer request, and sending the media flow transfer request to a network side;

converting, by an access gateway function (AGF), the media flow transfer request into the SIP session request after receiving the media flow transfer request; and sending, by the AGF, the SIP session request to the MTF via an IMS network.

17. The method according to claim 13, wherein if the MTF UE initiates the media flow transfer request in the IMS domain, the media flow transfer context information is carried in the request when the SIP session request is assembled.

* * * * *

UNITED STATES PATENT AND TRADEMARK OFFICE
CERTIFICATE OF CORRECTION

PATENT NO.        : 8,594,013 B2
APPLICATION NO.   : 12/470769
DATED             : November 26, 2013
INVENTOR(S)       : Dongjun Wu It is certified that error appears in the above-identified patent and that said Letters Patent is hereby corrected as shown below:

Title page, Item 57 Abstract, Line 4, "cannot be transfer between bearers" should read -- cannot be transferred between bearers --.

In the Claims:

Column 19, Claim 12, line 49 "components remains in" should read

-- components remain in --.

Column 20, Claim 15, line 36 "through an network-network" should read

-- through a network-network --.

Signed and Sealed this
Eighteenth Day of February, 2014

Michelle K. Lee
*Deputy Director of the United States Patent and Trademark Office*